United States Patent [19]
Nollace et al.

[11] 3,909,621
[45] Sept. 30, 1975

[54] METHOD FOR CONNECTING A STATIC INVERTER AND A POWER SOURCE IN PARALLEL TO SUPPLY ELECTRIC ENERGY TO A LOAD AND A LOGIC DEVICE FOR IMPLEMENTING THE METHOD

[75] Inventors: Pierre Nollace, Lamanon; Daniel Soleil; Georges Chabane, both of Salon-de-Provence; Antoine Bedrossian, Marseille, all of France

[73] Assignee: Compagnie Generale d'Electronique Industrielle Lepaute, France

[22] Filed: Apr. 9, 1974

[21] Appl. No.: 459,406

[30] Foreign Application Priority Data
Apr. 9, 1973  France ............................ 73.12702

[52] U.S. Cl. ...................... 307/64; 307/86; 307/87
[51] Int. Cl.² .......................................... H02J 7/00
[58] Field of Search ............ 307/46, 64, 66, 80, 81, 307/86, 87

[56] References Cited
UNITED STATES PATENTS
3,614,461  10/1971  Speer et al. .......................... 307/64
3,703,644  11/1972  Thorborg ............................. 307/64
3,710,133  1/1973  Ferraro ................................ 307/66
3,714,452  1/1973  Williamson ........................... 307/64
3,805,139  4/1974  Hoffman, Jr. et al. ................ 307/66

Primary Examiner—William H. Beha, Jr.
Attorney, Agent, or Firm—Craig & Antonelli

[57]  ABSTRACT

The method for connecting a static inverter and a power source in parallel to a load comprising the preliminary step of adjusting the voltage, frequency and phase of the static inverter to those of the power source by servo-control of these characteristics of the static inverter output, and the further steps of effectively connecting the static inverter and power source in parallel with the load, and simultaneously replacing the voltage servo-control by current servo-control of the static inverter output and modifying the frequency and phase of the static inverter output by synchronizing the master clock of the static inverter. A logic circuit for carrying out this method is further described.

11 Claims, 3 Drawing Figures

METHOD FOR CONNECTING A STATIC INVERTER AND A POWER SOURCE IN PARALLEL TO SUPPLY ELECTRIC ENERGY TO A LOAD AND A LOGIC DEVICE FOR IMPLEMENTING THE METHOD

The invention relates to static inverters which are electrical devices transforming a direct current or rectified current into an alternating current and which comprise, for that purpose, a switching circuit provided with controlled rectifiers, a filter arranged after the switching circuit and a pilot circuit provided with a master clock. The switching circuit rectifies the direct or rectified current by means of its controlled rectifiers. The filter transforms the output signal of the switching circuit into sinusoidal signals. The pilot circuit supplies the firing signals to the controlled rectifiers of the switching circuit. The frequency and the phase of the output signal of a static inverter may be modified by affecting the master clock of the pilot circuit, since the latter determines, by means of the pilot circuit, the duration of the operating cycle of the switching circuit and consequently the period of the output signal of the static inverter. The output voltage of the inverter may also be modified by affecting the pilot circuit, since the latter determines the relative durations of firing of the controlled rectifiers of the switching circuit.

A static inverter preceded by a charge rectifier and a storage cell battery is often used as intermediate equipment between a load and an electrical power source, such as the mains, to avoid making the load undergo interference, fluctuations and outages due to the power source. But such a circuit has the disadvantage of limiting the power that may be supplied to the load to the maximum power which the static inverter can supply. It also has the disadvantage, in the case of a supply without outage of the load, of making it compulsory to operate the static inverter without any interruption.

One solution for overcoming these disadvantages consists in the connecting up in parallel of the power source to the output of the static inverter, either to enable the static inverter to be assisted during the instants when the load requires its maximum power, or to enable a transfer without an outage of the load of the static inverter to the power source with a view to cutting the latter momentarily out of circuit. The aim of the present invention is to enable such a connecting up in parallel.

The method according to the invention for connecting up in parallel, for supplying a load, a power source with a static inverter having an output signal with voltage and frequency characteristics similar to those of the power source and comprising a switching circuit followed by a filter and controlled by a pilot circuit and a master clock, comprises the following steps:

Adjusting the voltage, the frequency and the phase of the output signal of the static inverter in relation to those of the power source; and Checking the non-momentary coincidence of the instantaneous output voltages of the static inverter and of the power source followed by an effective connecting up in parallel of the static inverter with the power source.

The adjusting of the output voltage of the static inverter in comparison with that of the power source is obtained by a voltage servo-control circuit affecting the pilot circuit of the static inverter and having, as its reference signal, the output signal of the power source and, as its measuring signal, the output signal of the static inverter. The adjusting of the phase and of the frequency of the output signal of the static inverter is obtained by a phase and frequency servo-control circuit affecting the master clock of the static inverter and having as its reference signal the output signal of the power source and, as its measuring signal, the output signal of the static inverter. The effective connecting up in parallel of the output of the static inverter and of the power source is accompanied simultaneously, on the one hand, by the stopping of the servo-controlling of the voltage and its replacement by servo-controlling of the current also affecting the pilot circuit of the static inverter and having, as its reference signal, the current absorbed by the load or that supplied by the power source and, as its measuring signal, the current output of the static inverter and, on the other hand, the transforming of the servo-controlling phase and of the frequency of the output signal of the inverter into a synchronizing of the master clock of the static inverter, using, as its measuring signal, the signal of the master clock instead of the output signal of the static inverter. The method comprises, moreover, all through the preceding steps, as well as after the effective connecting up in parallel of the ouput of the static inverter with the power source, checks on the static inverter or on the power source consisting of testing to see if the characteristics of these latter come within the limits of tolerances fixed at random and causing, in the case where these latter are not complied with, a momentary or permanent interruption of the parallel connection or of the parallel connecting up method with the elimination from the circuit of the defective element.

The invention also has for its object a logic device for the implementing of the preceding method. That logic device comprises:

A first coincidence gate whose inputs are connected up to the output of a locking circuit, to the output of a first device for checking the power source and to the output of a device emitting a signal for coupling the power source to the load, the first coincidence gate providing a signal for coupling the power source to the load only by enabling signals of the locking circuit and of the first device for checking the power source;

The locking circuit having an energising input connected to that of a second device for checking the power source, a de-energising input connected up to the output of the device emitting the signal for coupling the power source to the load and an output connected to one of the inputs of the said first coincidence gate, and said locking circuit emitting, when there is a signal for coupling the power source to the load and when it has been activated by the second device for checking the power source, a blocking or inhibiting signal for the first coincidence gate, and being de-energised by the canceling of the signal for coupling the power source to the load;

A pre-detector circuit having two inputs, one connected to the output of a device emitting a signal for the coupling of the static inverter to the load, the other input connected to the output of the first coincidence gate, the pre-detector circuit allowing only the first of the two coupling signals reaching its inputs to be passed;

A second coincidence gate having several inputs with a first input connected up to the output of the device emitting the signal for coupling the static inverter to the load, a second input connected up to the output of the first coincidence gate, a third input connected up to the output of a device for checking the coincidence of the instantaneous output voltages of the static inverter and of the power source and the output of the second coincidence gate connected up to the input of a timing unit, the second coincidence gate emitting a signal for activating the timing unit only if enabling signals of the device for checking the coincidence of the instantaneous voltages and the signals for coupling the static inverter and the power source to the load are applied simultaneously;

The timing unit connected with its input to the output of the second coincidence gate and at its output to one of the inputs of an order selecting circuit, the timing unit emitting a certain time signal after having been energised by the second coincidence gate and if that energising is maintained, a simultaneous signal for the coupling of the static inverter and of the power source to the load;

The selector circuit having three inputs and two outputs with two of its inputs connected up to the outputs of the pre detector circuit, its third input connected up to the output of the timing unit and its output connected up to the inputs of two devices, one of which actuates a contactor arranged between the inverter and the load, and the other of which actuates a contactor arranged between the power source and the load, the order selector circuit transmitting to these devices for actuating the coupling signals which is receives from the pre detector circuit and from the timing unit;

A third coincidence gate having its inputs connected up to the outputs of devices recopying the positions of the contactors and its output connected up, on the one hand, to one of the inputs of a fourth coincidence gate and on the other hand to the input of a device controlling the energizing and de-energizing of the servo-controlling of the current of the output of the inverter and of the synchronizing of the master clock of the latter, the third coincidence gate emitting, in the case of the simultaneous closing of the two contactors, a signal for the blocking of fourth coincidence gate and for the energizing the servo-controlling of the current and of the synchronising;

And the fourth coincidence gate having a first input connected up to the output of the device emitting the signal for the coupling of the static inverter to the load, a second input connected up to the output of the first coincidence gate, a third input connected up to the output of the third coincidence gate and the output of the fourth coincidence gate connected up to the input of a device controlling the energizing and de-energizing of the servo-controlling of the voltage, frequency and phase of the output of the static inverter, the fourth coincidence gate emitting, in the case where signals for coupling the static inverter and the power source to the load are applied simultaneously to its inputs and where no blocking signal comes from the output of the third coincidence gate, a signal for energizing the servo-controlling of the voltage, frequency and phase of the output signal of the static inverter.

Other characteristics and advantages of the invention will become apparent from the following description of an embodiment given by way of an example. That description will be made with reference to the drawing, in which.

Figure 1:
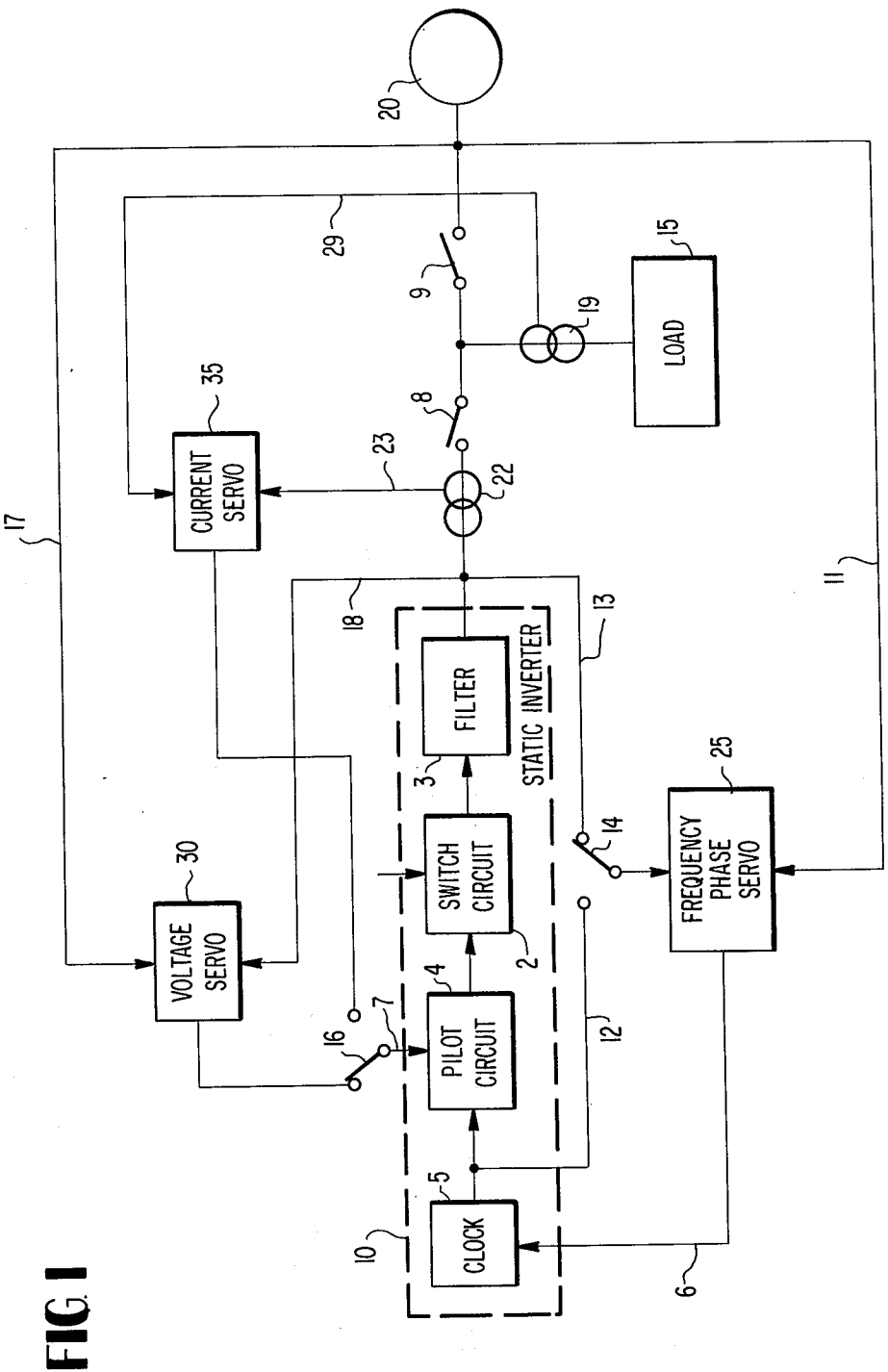
FIG. 1 is a wiring diagram of the interconnections between a static inverter, a power source and a load during the implementing of the method.

FIG. 1 shows a load 15 which may be supplied either by a static inverter 10 by means of the contactor 8, or by an alternate electrical power source 20 by means of the contactor 9, or by both simultaneously.

The static inverter 10 is single-phased or polyphased. It transforms a rectified or direct current into alternating current. It comprises, for that purpose, a switching circuit 2 having controlled rectifiers, a filter 3, a pilot circuit 4 and a master clock 5. The switching circuit 2 receives direct or rectified electric voltage from an electric power source which is not shown and which may be constituted, for example, by the power source 20 followed by a rectifying circuit. The switching circuit rectifies pulses of that direct or rectified voltage by means of its controlled rectifiers. The filter 3 transforms the pulses available at the output of the switching circuit 2 into sinusoidal signals. The pilot circuit 4 supplies the firing signal to the controlled rectifiers of the switching circuit 2 at a frequency determined by that of the master clock 5. The frequency and the phase of the output signal of the static inverter 10 depend on those of the master clock 5 and are adjusted in a manner known per se by affecting the latter. The connection 6 represents the control affecting the frequency and the phase of the master clock 5. The latter is, for example, a polarising control for a variable capacity diode arranged in the tuning circuit of an oscillator constituting the master clock 5. The voltage of the output signal of the static inverter 10 is adjusted also in a manner known per se by affecting the durations of conductivity of the controlled rectifiers of the switching circuit 2 during a period of the output signal of the inverter. The connection 7 represents the control on the pilot circuit 4 making it possible to effect such an adjustment.

The static inverter 10 may be connected, by means of an inverter 16, either with voltage servo-controlling circuit 30 for controlling its output signal, or with current servo-controlling circuit 35 for controlling its output signal. These servo-controlling circuit 30 and 35 affects, in a manner known per se, the pilot circuit 4. The one, namely, the voltage servo-controlling circuit 30, has, as its reference magnitude, the output voltage of the power source 20 by means of the connection 17 and, as its measuring magnitude, the output voltage of the static inverter 10 by means of the connection 18. The other, namely the current servo-controlling circuit 35, has, as its reference magnitude, the current absorbed by the charge load 15, by means the connection 29 and of the current transformer 19 and, as its measuring magnitude, the current output of the static inverter 10 by means of the connection 23 and of the current transformer 22.

The static inverter 10 may also be connected, by means of an inverter 14, either with a frequency and phase servo-controlling circuit for controlling its output signal, or with a synchronisation for its master clock. This is obtained by means of the same servo-controlling circuit 25 for frequency and phase affecting, in a manner known per se, the master clock 5 through the connection 6 and having, as reference magnitude, the frequency and phase of the power source 20 through the connection 11 and, as measuring magnitudes, either the frequency and the phase of the output signal of the static inverter 10 through the connection 13, or the frequency and the phase of the master clock 5 through the connection 12.

The method for the parallel connecting applies just as well when the load 15 is fed by the static inverter 10 alone as when the latter is fed by the power source 20 alone. It begins when one of the two contactors 8 or 9 is closed and when it is required to close the other. It is expressed on the one hand by successive modifications of the servo-control of the static inverter 10 and on the other hand by checking of the characteristics of the static inverter 10 or of the power source 20 which could cause at any moment an immediate temporary or permanent interruption of the method for connecting up in parallel and of the parallel connection when it is effective. FIG. 1 makes it possible to follow more particularly the modifications of the servo-controlling.

From the point of view of servo-controlling, the method comprises two phases:

A first phase during which the static inverter 10 is subjected, on the one hand, to the voltage servo-controlling circuit 30 of its output signal, the mobile contact of the inverter 16 being electrically connected to the output of this servo-controlling circuit and, on the other hand, to the phase and frequency servo-controlling circuit of its output signal, the mobile contact of the inverter 14 being linked to the connection 13;

And, after an enabling signal from a device controlling the non-momentary coincidence of the instantaneous output voltages of the static inverter 10 and of the power source 20, a second phase consisting in closing that of the two contactors 8, 9 which was still open to effect the connecting up in parallel of the static inverter 10 and of the power source 20 and in maneuvering, at the same instant, the invertors 16 and 14, in order, on the one hand, to cancel the voltage servo-controlling circuit 30 of the output signal of the static inverter 10 and to replace it by the current servo-control means 35 of the output signal of the static inverter 10 and, on the other hand, to transform the phase and frequency servo-controlling circuit 25 of the output signal of the static inverter into a synchronising of the master clock 5.

From the point of view of the checks on the characteristics of the static inverter 10 and of the power source 20, these latter are reduced in the embodiment described, on the one hand, to a check of the frequency and of the phase of the power source 20 and, on the other hand, to a check of the power coming from the static inverter 10 possibly absorbed by the power source 20. The check on the frequency and the phase of the power source 20 consists in testing to see if these latter come within the limits of tolerances previously fixed at random. It causes, in the case where these latter are not complied with, an immediate stopping of the method for connecting up in parallel and of the connection in parallel if the latter is effective, with elimination circuit of the power source by the opening of the contactor 9, as well as a new activation by hand of the method in the case of elimination the defect. The checking of the power possibly absorbed by the power source 20 causes, when the power source 20 absorbs effectively any power coming from the static inverter 10, the immediate stopping of the connecting up in parallel, an elimination from the circuit of the power source 20 by the opening of the contactor 9 and a blocking of the method preventing any subsequent connecting up in parallel without an observing of the defect by an operator.

Figure 2:
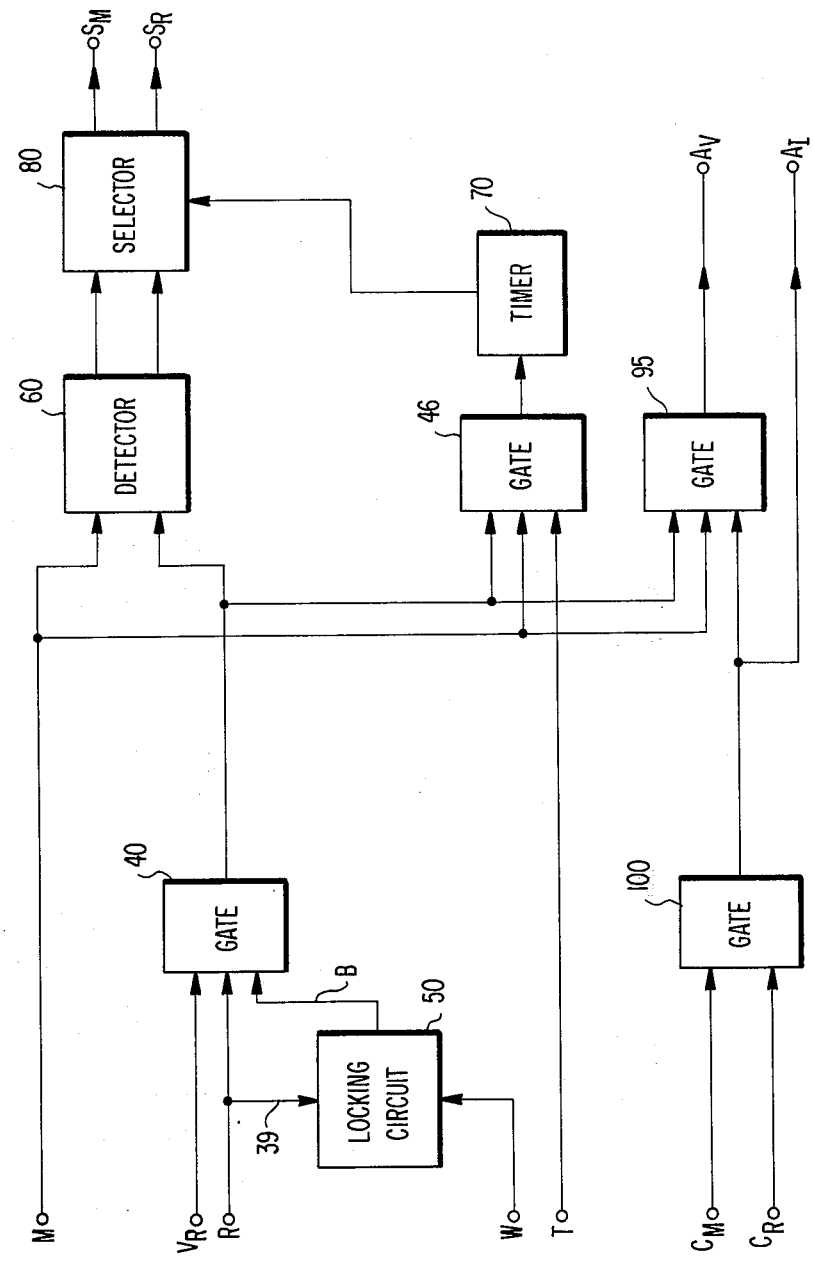
FIG. 2 is a wiring diagram of a logic device for implementing the method.

FIG. 2 is a wiring diagram of a logic device for implementing the method. This device comprises:

A first coincidence gate 40 having several inputs and an output, whose input B is connected up to the output of a locking circuit 50, whose input Vr is connected up to the output of a first checking device for the power source 20, not shown, and whose input R is connected up to the output of a device, not shown, emitting an signal for coupling the power source to 20 to the load 15;

The locking circuit 50 having an energising input W connected up to the output of a second checking device for the power source 20, not shown, a de-energising input 39 connected up to the output of the device which emits the coupling signal for coupling the power source 20 to the load 15 not shown and its output B connected up to one of the inputs of the first coincidence gate 40;

A pre detector circuit 60, having two inputs and two outputs, one of its inputs, M, being connected up to the output of a device which emits the signal for coupling the inverter 10 to the load and which has not been shown and the other of its inputs being connected up to the output of the first coincidence gate 40;

A second coincidence gate 46 having several inputs with a first input connected up to the output of the device which emits the signal for coupling the inverter 10 to the load 15 and which is not shown, a second input connected up to the output of the first coincidence gate 40, a third input T connected up to the output of a device for checking the coincidence of the instantaneous output voltages of the static inverter 10 and of the power source 20 and its output connected up to the input of a timing unit 70;

The timing unit 70 whose input is connected up to the output of the second coincidence gate 46 and whose output is connected up to one of the inputs of a signal order selector circuit 80;

The said order selector circuit 80 has three inputs two outputs having two of its inputs connected up to the outputs of the pre detector circuit 60, its third input connected up to the output of the timing unit 70 and its outputs connected up to the inputs of the actuating devices, not shown, of the contactors 8 and 9;

A third coincidence gate 100 whose inputs are connected up to the outputs Cm Cr of devices, not shown, recopying the positions of the contactors 8 and 9 and whose output is connected up on the one hand to one of the inputs of a fourth coincidence gate 95 and on the other hand to the input Ai of a device, not shown, controlling the energizing and de-energizing of the current servo-controlling circuit 35 and of the synchronising of the master clock 5;

And the fourth coincidence gate 95 having a first input connected up to the output of the device which emits a signal for coupling the inverter 10 to the load 15 and which is not shown, a second input connected up to the output of the first coincidence gate 40, a third input connected up to the output of the third coincidence gate 100 and an output connected up to the input Av of a device, not shown, controlling the energizing and de-energizing of the voltage servo-controlling circuit 30 and current servo-controlling circuit 25 for the output signal of the static inverter 10.

That logic device receives, at its various inputs, the following binary orders:

On its input M, an order coming from a device transmitting the order for coupling the static inverter 10 to the load 15, that device possibly being, for example, a push-button transmitting the order of an operator;

On its input R, an order coming from a device transmitting the order for coupling the power source to the load 15, that device also possibly being a push-button;

On its input Vr, an enabling or blocking order coming from a first device for checking the power source 20, this device possibly being producted for example by means of comparators comparing the voltage and the frequency of the power source 20 in relation to a voltage and to a reference frequency and emitting a blocking order if the difference detected are greater than tolerance limits fixed at random, for example 10 percent for the voltage and 2 percent for the frequency;

On its input W, an enabling blocking order coming from a second device for checking the power source 20, this device possibly being, for example, a directional relay arranged following the contactor 9 indicating the direction of transfer of the power, emitting a blocking order in the case of energy absorbed by the power source 20;

On its input T, an enabling order or blocking order for a device for checking the coincidence of the instantaneous output voltages of the static inverter 10 and of the power source 20, that device possibly being produced by means of a comparator emitting a blocking order as long as the voltages are unequal;

On its input Cm, a signal coming from a device recopying the position (open or closed) of the contactor 8, that device possibly being produced by means of an auxiliary contact arranged on the contactor 8;

And on its input Cr a signal coming from a device recopying the position (open or closed) of the contactor 9, that device also possibly being produced by means of an auxiliary contact arranged on the contactor 9.

The logic device emits, on its various outputs, the following binary orders: At the output Sm, a opening order or closing order for the contactor 8 applied to the device for actuating the latter;

At the output Sr, an opening order or closing order for the contactor 9 applied to the device for actuating the latter;

At the output Av, energizing or de-energizing orders for the voltage servo-controlling circuit 30 and for the frequency and phase servo-controlling 25 for the output signal of the static inverter 10 applied for example to the inverters 14 and 16;

And at the output Ai, energizing or de-energizing orders for the current servo-controlling circuit 35 of the output signal of the static inverter 10 and of the synchronising circuit 25 of the master clock 5, applied, for example, to the inverters 14 and 16.

The first coincidence gate 40 inhibits an order for coupling the power source 20 to the load 15 without enabling orders of the locking circuit 50 and of the first checking device for the power source 20 which received at the inputs Vr and B.

The locking circuit 50 emits, when an order for coupling the power source 20 to the load 15 is received at its de-energising input 39 and when it has activated up by a blocking order applied to its input W, a blocking order for the first coincidence gate 40. It is de-energised by the cancellation of the order for coupling the power source 20 to the load 15.

The pre detector circuit 60 transmits at one of its outputs the order for coupling the static inverter 10 to the load 15 only if this order is applied at one of its inputs in the absence of an order for coupling the power source 20 to the load 15 at the other of its inputs. It transmits likewise at its other output the order for coupling the power source 20 to the load 15 only if this order is applied at its other input when there is no order for coupling the static inverter 10 to the load 15. In this way, when the orders for coupling the static inverter 10 and the power source 20 to the load 15 are applied simultaneously at the inputs of the pre-detector circuit 60, only the first to be applied is transmitted.

The second coincidence gate 46 emits, at the output, an enabling order for the timing unit 70 only when it receives simultaneously at its inputs the enabling order of the device for checking the coincidence of the instantaneous output voltages of the static inverter 10 and of the power source 20 and the coupling orders of the static inverter 10 and of the power source 20 to the load 15; otherwise, the timing unit remains 70 blocked.

The timing unit 70 emits, a certain time after having been energised by the second coincidence gate 46 if this energising is maintained, a simultaneous order for coupling the static inverter 10 and the power source 20 to the load 15.

The order selector 80 transmits at its outputs Sm and Sr, the coupling orders which it receives from the pre-detector circuit 60 and from the timing unit 70.

The third coincidence gate 100 emits in the case of simultaneous closing of the two contactors 8 and 9 (FIG. 1), a blocking order for the fourth coincidence gate 95 and an order for energizing the current servo-controlling circuit 35 of the output of the static inverter 10 and of the synchronising of the master clock 5.

The fourth coincidence gate 95 emits, in the absence of a blocking order coming from the third coincidence gate 100 and when orders for coupling the static inverter 10 and the power source 20 to the load 15 are applied to its inputs, an order for energizing voltage servo-controlling circuit 30 and frequency and phase servo-controlling means 25 for the output signal of the static inverter 10.

That logic device has a great versatility of use and is adapted to all possible cases of operation.

If the logic device does not receive any coupling order at its inputs M and R, it does not emit any closing order for the contactors 8 and 9. Indeed, the pre detector circuit 60 does not transmit any coupling order at its outputs since it does not receive any at its inputs. Since the second coincidence gate 46 does not receive any coupling order at its inputs, it keeps the timing unit 70 blocked so that the latter does not emit any simultaneous order for coupling the static inverter 10 and the power source 20. Since the order selector 80 does not receive any coupling order from the pre detector circuit 60 and from the timing unit 70, it does not emit any closing order for the contactors 8 and 9. Moreover, no servo-controlling is activated for the third and fourth coincidence gates 100 and 95 are blocked, the one because the two contactors 8 and 9 are open, the other because it does not receive any coupling order at its inputs.

If the logic device receives only the order for coupling the static inverter 10 to the load 15 on its input M, it emits at the output only an order for closing the contactor 8. Indeed, the pre detector circuit 60, receiving, on one of its inputs, the order for the coupling of the static inverter 10 to the load 15 when there is no order for coupling the power source 20 to the load 15 on its other input, transmit that order to the order selector circuit 80 which, in response, controls the closing of the contactor 8. Since the second coincidence gate 46 does not receive on its inputs the order for coupling the power source 20 to the load 15, it keeps the timing unit blocked, so that the latter does not emit the simultaneous order for coupling the static inverter 10 and the power source 20 to the load 15 so that the order selector circuit 80 keeps the contactor 9 open. Moreover, no servo-controlling is activated, for the third and fourth coincidence gates 100 and 95 are blocked, the one because the contactor 9 is open, the other, because it does not receive the order for coupling the power source 20 to the load 15.

If, when no blocking order is applied to its inputs Vr and W, the logic device receives only the order for coupling the power source 20 to the load at its input R, it emits at the output only an order for closing the contactor 9. Indeed, when there is no order for blocking the locking circuit 50 and no blocking order at its input Vr, the first coincidence gate 40 transmits the order for coupling the power source 20 to the load 15 on one of the inputs of the pre detector circuit 60. The latter transmits that order to the order selector circuit 80 since it does not receive simultaneously, through its other input, an order for coupling the static inverter 10 to the load 15. The selector circuit 80 controls the closing of the contactor 9. Since the second coincidence gate 46 does not receive, on its inputs, any order for coupling the static inverter 10 to the load 15, it blocks the timing unit 70 so that the latter does not emit any simultaneous order for the coupling of the static inverter 10 and of the power source 20 to the load 15 and so that the order selector 80 keeps the contactor 8 open. Moreover, no servo-controlling is activated, for the third and fourth coincidence gates 100 and 95 are blocked, the one because the contactor is open, the other because it does not receive any order for coupling the static inverter 10 to the load 15.

The logic device implements the method for connecting up in parallel as soon as it receives on its inputs M and R the orders for coupling the static inverter 10 and the power source 20 to the load 15. Let it be supposed that the logic device has received in priority at its input M the order for coupling the static inverter 10 to the load 15 and that it has not received any blocking order at its inputs Vr and W. On receiving the order for coupling the static inverter 10 to the load 15, the logic device transmits this order to the device for actuating the contactor 8 through the pre detector circuit 60 and the other selector circuit 80. The first coincidence gate 40 transmits, at its output, the order for coupling the power source 20 to the load 15 as soon as it has received it on its input R. The gate 40 applies this order firstly to one of the inputs of the pre detector circuit 60 without causing any modification in the state of the outputs of the circuit, since it already receives, on its other input, the order for coupling the static inverter 10 to the load 15, secondly, to one of the inputs of the second coincidence gate 46 which may then be unblocked by its input T and thirdly, to one of the inputs of the fourth coincidence gate 95 which receives, on an other input, the order for coupling the static inverter 10 to the load 15 when no blocking order comes from the third coincidence gate 100, the contactor 9 being open. The gate 95 therefore emits an order for energizing of the voltage servo-controlling circuit 30 and frequency and phase servo-controlling circuit 25 of the output of the static inverter 10. This servo-controlling causes the equalising of the instantaneous output voltages of the static inverter 10 and of the power source 20 and hence the cancelling of the blocking signal possibly applied to the input T. The second coincidence gate 46 unblocks the timing unit 70 which is energizied and which, after a certain lapse of time and if the second coincidence gate 46 has remained unblocked, emits a simultaneous order for coupling the static inverter 10 and the power source 20 to the load 15. This last order applied to one of the inputs of the order selector circuit 80 causes the closing of the contactor 9 and consequently the effective connecting up in parallel of the static inverter 10 and of the power source 20 with the load 15.

The logic device operates in a similar way to the preceding method if the order for coupling the power source 20 to the load 15 is applied to it in the first instance.

If, after the applying of the order for coupling the power source 20 to the load 15, the first device for checking the power source 20 applies a blocking order to the input Vr of the logic device, for example subsequent to a defective voltage or frequency of the power source 20, the first coincidence gate 40 becomes blocked, causing, by the cancelling of the applying of the order for coupling the power source 20 to the inputs of the pre detector circuit 60 and of the second and fourth coincidence gates 46 and 95, the blocking of the timing unit 70 and of the second and fourth gates 46 and 95, and consequently, the opening of the contactor 9, the blocking of the third coincidence gate 100 and the de-energizing of the servo-controlling and synchronising circuit 25, 30, 35. After elimination the defect, the first device for checking the power source 20 cancels its blocking order, the first coincidence gate 40 becomes unblocked and one of the preceding cases of operation is observed.

The applying of a blocking order to the input W of the logic device, by the second device for checking the power source 20, during the applying of an order for coupling the power source 20 to the load 15, to the input R of the logic device has the effect of energizing the locking circuit 50 which then applies a blocking order to the input B of the first coincidence gate 40. The blocking of the first coincidence gate 40 has the same effects as previously. It causes the opening of the contactor 9 and the cancelling of the servo-controlling and the synchronisation circuit 25, 30, 35. After canceling the blocking order applied to the input W of the device, the locking circuit 50 remains active and continues to block the first coincidence gate 40 as long as the order for coupling the power source 20 the load 15 has not been cancelled. As soon as the latter is cancelled, the locking circuit 50 is de-energised and ceases to block the first coincidence gate 40. The coupling of the power source 20 to the load 15, as well as the connecting up in parallel of the power source 20 to the output of the static inverter 10, may not be interrupted without the assistance of an operator. This is of great interest when the defect detected by the second checking device is a defect which appears only at the time of the effective connecting up in parallel of the power source 20 and of the static inverter 10, for a beat of the contactor 9 is thus avoided.

Figure 3:
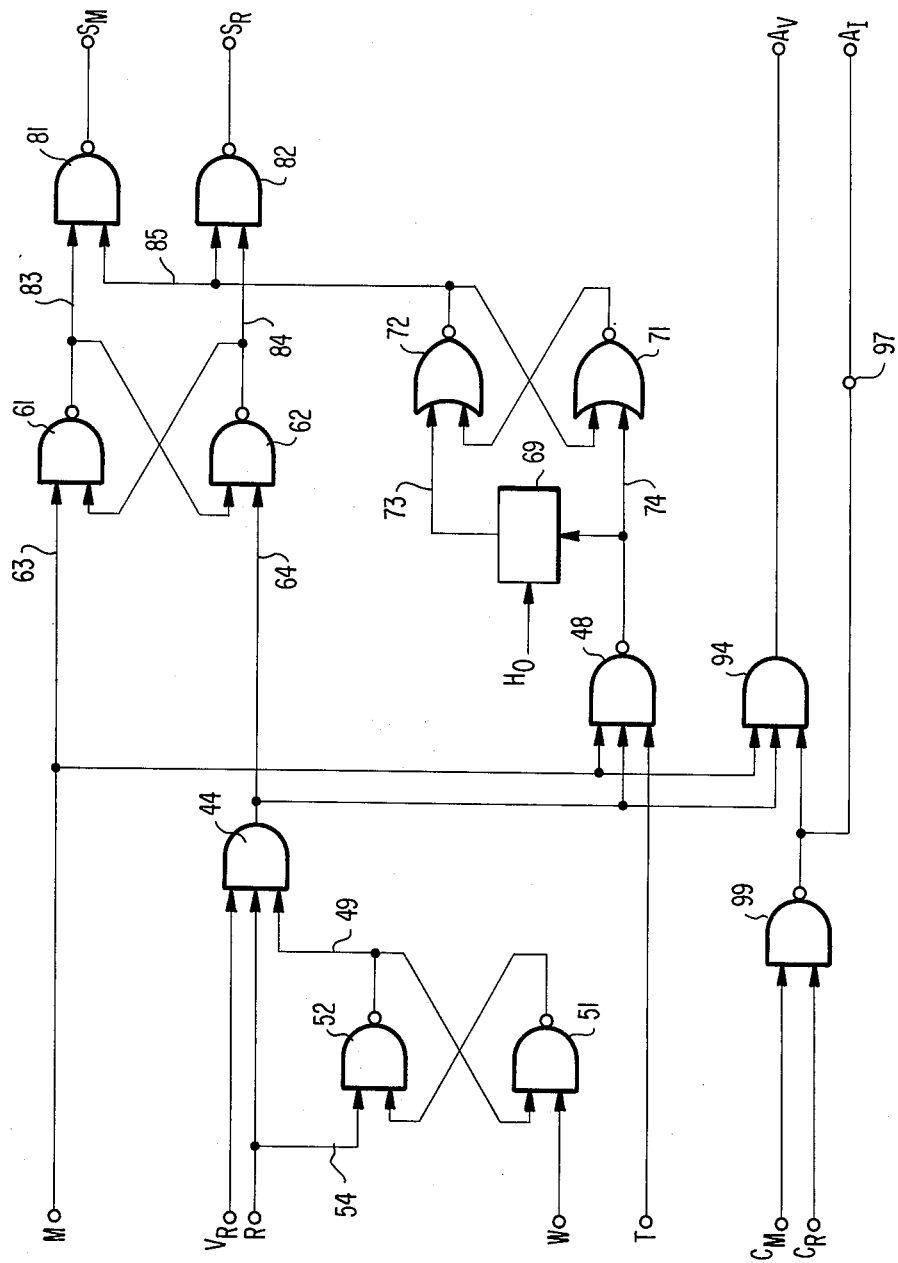
FIG. 3 is the wiring diagram of an embodiment of the preceding logic device using logic "and," "or," "nor," "nand" gates.

FIG. 3 is the wiring diagram of an embodiment of the preceding logic device using logic "and," "or," "nand" and "nor" gates. For that embodiment, it has been assumed that a coupling order is transmitted to the inputs R, M of the logic device at a logic level 1 and the absence of the coupling order is transmitted at a logic level 0, that a blocking order at the inputs Vr and W of the logic device occurs at a logic level 0 and its absence occurs at a logic level 1, that the closing position of the contactors 8 and 9 is provided at the inputs Cm and Cr of the logic device at a logic level 1, whereas the opening position is provided at a logic level 0, that a logic level 1 at the outputs Sm, Sr of the logic device corresponds to an order for closing the corresponding contactor 8, 9 whereas a logic level 0 at these same outputs Sm, Sr corresponds to an order for opening the corresponding contactor 8, 9, and that a logic level 1 at the outputs Av, Ai of the logic device corresponds to an order for energizing servo-controlling whereas the logic level 0 corresponds to de-energizing of this servo-controlling.

The first coincidence gate 40 is a logic "and" gate 44. Its output converts to the logic level 1 when it receives simultaneously, at its inputs, logic levels 1 corresponding to the applying at the latter of an order for coupling the power source to the load 15, when no blocking order comes from the locking circuit 50 and from the device for checking the power source 20.

The locking circuit 50 comprises a first logic "nand" gate 51 and second logic "nand" gate 52, having two inputs connected up as a flip-flop, the output of the one being connected up to one of the inputs of the other and vice-versa. The remaining input W of the first logic "nand" gate 51 is the energising input of the locking circuit 50. The remaining input 54 of the second logic "nand" gate 52 is the de-energising input of the locking circuit 50. The output 49 of that same second logic "nand" gate 52 is the output of the said locking circuit 50.

If the de-energising input is at the logic level 1, the change, be it even temporary, to the logic level 0, of the energising input W causes the applying and maintaining, at the output 49 of the locking circuit 50, of a logic level 0 which causes the applying and the maintaining of a logic level 0 at the output of the logic "and" gate 44, that is, the blocking of the first coincidence gate 40. Indeed, the applying of a logic level 0 at the energising input W causes the change over to the logic level 1 of the output of the first logic "nand" gate 51 and, by way of consequence, the changing over to the logic level 0 of the output of the second logic "nand" gate 52, the latter having all its inputs at the logic level 1. The logic level 0 of the output of the second logic "nand" gate 52 is applied to one of the inputs of the first logic "nand" gate 51 and has the effect of maintaining the output of the latter at the logic level 1 even if its input W changes over again to the logic level 0.

If the de-energising input 54 is brought to the logic level 0, the output of the second logic "nand" gate 52 and consequently that of the locking circuit 50, changes to the logic level 1, whatever the logic level of its other input and consequently of the energising input W may be. If the energising input W is at the logic level 1, the change, be it even temporary, to the logic level 0 of the de-energising input causes the applying and maintaining of a logic level 1 at the output of the locking circuit 50. Indeed, the logic level 1, which appears at the output of the second logic "nand" gate 52 when the de-energising input 54 is brought to the logic level 0, is applied to one of the inputs of the first logic "nand" gate 51, whose output changes over to the logic level 0, this latter having all its inputs at the logic level 1. That logic level 0 at the output of the first logic "nand" gate 51 is applied to one of the inputs of the second logic "nand" gate 52 and has the effect of maintaining the output of the latter at the logic level 1 even if the de-energising input changes back to the logic level The pre detector circuit 60 comprises two logic "nand" gates 61 and 62 having two inputs interconnected as a flip-flop, the output of the one being connected up to one of the inputs of the other and vice-versa. The remaining inputs 63, 64 of the said logic "nand" gates 61, 62 constitute the inputs of the pre detector circuit 60 and their outputs constitute those of that same pre detector circuit 60.

The outputs of the logic "nand" gates 61, 62 may assume three distinct states. They may both be in a position corresponding to the logic level 1. When this is the case, they receive at their inputs 63, 64 a logic level 0 revealing the absence of an order for coupling the static inverter 10 to the load 15 at the input M and the absence of an order for coupling the power source 20 to the load 15 at the output of the logic "and" gate 44. The outputs of the NAND gates 61, 62 may also be, one at the logic level 0, and the other at the logic level 1. When this is the case, the logic "nand" gate 61 or 62 whose output is at the logic level 1 is that whose input 63 or 64 has been maintained for the longest time at the logic level 0. When that pre detector circuit 50 thus formed receives two coupling orders materially transformed into the logic levels 1 applied to its inputs the circuit 60 allows only the first order to pass at its outputs in the form of a logic level 0.

The order selector circuit 80 comprises two logic "nand" gates 81, 82 having two inputs, each with an input 85 connected up to the output of the timing unit 70 and their other inputs 83, 84 connected up to the outputs of the pre detector circuit 60, that is, to those of the logic "nand" gates 61, 62. When these logic "nand" gates 81, 82 receive a logic level 1 at their input 85 coming from the timing unit 70, they act as inverters and transmit to their outputs Sm, Sr, in the form of a logic level 1, the coupling order which is possibly transmitted to them at one of their inputs 83, 84, in the form of a logic level 0. When these logic "nand" gates 81, 82 receive a logic level 0 on their input 85 coming from the timing unit 70, their outputs Sm and Sr change over to the logic level 1, this causing the closing of the contactors 8 and 9.

The second coincidence gate 46 consists of a logic "nand" gate 48. The timing unit comprises a digital counter 69 having a common input for blocking and resetting to zero, a counting input connected up to a pulse generator Ho, not shown, and an output, as well as a first logic "nor" gate 71 and second logic "nor" gate 72, having two inputs interconnected as flip-flops, the output of the one being connected up to one of the inputs of the other and vice-versa. The remaining input 74 of the first logic "nor" gate 71 is connected up to that of the input for blocking and resetting to zero of the counter 69 and constitutes the input of the timing unit 70. The remaining input 73 of the second logic "nor" gate 72 is connected up to the output of the counter 69. The output of that logic "nor" gate 72 is also that of the timing unit 70.

The counter 69 is activated when it receives a logic level 0 at its input for blocking and resetting to zero. It is blocked and reset to zero when it receives a logic level 1 on that same input. When the counter 69 is activated it counts the pulses which are supplied to it by the pulse generator Ho. Its output remains at the logic level 0 as long as it has not reached its maximum capacity, at which time its output passes through a logic level 1 then returns to the logic level 0. When the output of the logic "nand" gate 48 is at the logic level 1, the timing unit 70 is blocked and its output is at the logic level 1. Indeed, a logic level 1 at the output of the logic "nand" gate 48 causes the blocking of the counter 69 and consequently a logic level 0 at the output of the latter, a logic level 0 at the output of the first logic "nor" gate 71 and, by way of consequence, a logic level 1 at the output of the second logic "nor" gate 72, the latter having its two inputs at the logic level 0. When the output of the logic 37 nand" gate 48 changes over to the logic level 0 and as long as the counter 69 has not reached its maximum capacity, the output of the timing unit remains at the logic level 1. Indeed, the change in the logic level of the input 74 of the first logic "nor" gate 71 has no effect on the latter, for its output is kept at the logic level 0 by the logic level 1 applied to its other input by the output of the second logic "nor" gate 72. If the output of the logic "nand" gate 48 remains at the logic level 0 until the counter 69 passes the through its maximum capacity, the output of the timing unit 70 changes over to the logic level 0. Indeed, as soon as the counter 9 passes through its maximum capacity, its output changes over to the logic level 1 and causes the second logic "nor" gate 72 whose output changes over to the logic level 0 to tilt. That logic level 0 is then applied to one of the inputs of the first logic "nor" gate 71 and has the effect of making it tilt, the output of the latter changing over to the logic level 1. That logic level 1 is applied to one of the inputs of the second logic "nor" gate 72 and has the effect of keeping the output of the latter, that is, that of the timing unit 70, at the logic level 0, even after the return to the logic level 0 of the output of the counter 69.

The third coincidence gate 100 is formed by means of a logic "nand" gate 99. Its output is connected up to the output Ai of the logic device by means of an inverter 97. The fourth coincidence gate 95 is a logic "and" gate 94.

The wiring diagram is FIG. 3 shows an embodiment of the logic device in FIG. 2. Moreover, other embodiments of this logic device may be found, taking inspiration from FIG. 3 and adopting a different code for the input and output signals of the logic device.

A particularly interesting application of the method for connecting up in parallel and of the logic device for the implementing thereof consists in the connecting up in parallel of a static inverter to the mains: checks will then bear essentially on the voltage and the frequency of the mains (Vr) and on its possible reaction as a receiver (W) due to the fact that it supplies simultaneously other loads than those of the static inverter.

What is claimed is:

1. In a method for connecting a static inverter and a power source in parallel to supply electric energy to a load, said static inverter comprising first circuit means for supplying said output signal, pilot circuit means for controlling said first circuit means and a clock circuit, said method comprising the steps of:
   A. adjusting the voltage of said output signal in relation to the power source voltage,
   B. adjusting the frequency and phase characteristics of said output signal in relation to the power source frequency and phase characteristics,
   C. checking coincidence of the instantaneous output voltages of said static inverter and said power source,
   D. thereafter effectively connecting said static inverter and said power source in parallel, and
   E. simultaneously replacing step (A) by the step of controlling the current of said output signal in relation to the current absorbed by said load, and modifying step (B) by the step of synchronizing said clock circuit.

2. The method of claim 1, further comprising during and after steps (A - E) the steps of
   comparing the characteristics of at least one of said static inverter and said power source to tolerances fixed at random, and
   immediately discontinuing steps (A - E) upon exceeding predetermined limits of said tolerances, including disconnecting from parallel said static inverter and said power source.

3. The method of claim 2, wherein step (A) includes voltage servo-controlling of said output signal by comparing said voltage of said output signal with said power source voltage, thereby controlling a control voltage input of said pilot circuit means, and wherein step (B) includes frequency and phase servo-controlling of said output signal by comparing the frequency and phase characteristics of said output signal with said power source frequency and phase characteristics.

4. The method of claim 3, wherein said step of controlling the current of said output signal includes current servo-controlling of said output signal by comparing the current of said output signal with the current absorbed by said load, thereby controlling the current of the control input signal of said pilot circuit means, and wherein said step of synchronizing said clock circuit includes comparing the frequency and phase characteristics of said clock circuit with said power source frequency and phase characteristics.

5. The method of claim 4, wherein the voltage, frequency and phase characteristics of said power source are compared with said tolerance limits to determine discontinuing of steps (A - E) and disconnecting of said static inverter and said power source, and further testing said power source for absorption of power from said static inverter, said disconnecting from parallel being effected permanently upon said absorption of power from said static inverter by said power source.

6. In a system for connecting a static inverter and a power source in parallel to supply electric energy to a load including first means for providing a first coupling signal for coupling said static inverter to said load, second means for providing a second coupling signal for coupling said power source to said load, third means for providing a first checking signal of said power source, fourth means for providing a second checking signal of said power source, fifth means for checking coincidence of the instantaneous output voltages of said static inverter and said power source and providing a first control signal selectively representative of coincidence or lack of coincidence, sixth means for connecting said static inverter and said power source in parallel, said sixth means being associated with seventh means for providing at least one of second and third control signals representative of connection of said static inverter to said load and connection of said power source to said load respectively, eighth means for controlling the voltage, frequency and phase of the output signal of said static inverter in relation to the output signal of said power source, and ninth means for controlling the current of said output signal of said static inverter in relation to the current absorbed by said load and for controlling synchronization of the clock circuit of said static inverter, a logic device responsive to said frist through fifth means and said seventh means for providing respective control signals to said sixth means, said eighth means and said ninth means such that said system is implemented.

7. The logic device of claim 6 comprising
first gate means responsive to said second coupling signal and said first checking signal for selectively passing said second coupling signal when enabled by said first checking signal,
locking circuit means responsive to said second coupling signal and said second checking signal for providing a blocking order to said first gate means in response to said second checking signal, said locking circuit means being de-energized when said second coupling signal is cancelled, said first gate means passing said second coupling signal only when enabled by both said first checking signal and said locking circuit means,
detector circuit means responsive to said first coupling signal and the second coupling signal passed from said first gate means for passing the first received of the two coupling signals,
second gate means responsive to said first coupling signal, said passed second coupling signal from said first gate means and said first control signal for emitting a fourth control signal only when said two coupling signals and said first control signal are simultaneously received by said second gate means,
timing circuit means responsive to said fourth control signal for emitting a simultaneous signal for coupling said static inverter and said power source to said load only after receiving said fourth control signal for a predetermined time and where said fourth control signal is maintained,
selector circuit means responsive to said detector circuit means and said simultaneous signal of said timing circuit means for providing at least one of a fifth and sixth control signal for controlling said sixth means,
third gate means responsive to said second and third control signals of said seventh means for emitting a seventh control signal, said seventh control signal activating said ninth means when both said static inverter and said power source are connected to said load, and
fourth gate means responsive to said first coupling signal, said passed second coupling signal and said seventh control signal for emitting an eighth control signal for activating said eighth means upon enabling by said seventh control signal when one of said static inverter and said power source is disconnected from said load.

8. The logic device of claim 7, wherein said first and fourth gate means comprise logic "AND" gates respectively and wherein said second and third gate means comprise logic "NAND" gates respectively.

9. The logic device of claim 8, wherein said detector circuit means comprises two logic "NAND" gates interconnected as a flip-flop, each of said two logic "NAND" gates of said detector circuit means receiving as one input one of said two coupling signals, and wherein said selector circuit means comprises two logic "NAND" gates, each of said two logic "NAND" gates of said selector circuit means receiving said simultaneous signal at one input and receiving respective outputs of said detector circuit means at another input.

10. The logic device of claim 9, wherein said timing circuit means comprises a digital counter having a common input for blocking and resetting to zero of said counter, said common input being connected to the output of said second gate means, said digital counter having further a counting input connected to a pulse generator and an output, and a first and second logic "NOR" gates interconnected as flip-flop, said first logic "NOR" gate having an input connected to said common input, and said second logic "NOR" gate having an input connected to said output of said digital counter, the output of said second logic "NOR" gate providing said simultaneous signal.

11. The logic device of claim 10, wherein said locking circuit means comprises first and second logic "NAND" gates interconnected as flip-flops, said first logic "NAND" gate of said locking circuit means receiving at one input said second checking signal, and said second logic "NAND" gate of said locking circuit means receiving at one input said second coupling signal, the output of said second logic "NAND" gate of said locking circuit means providing the output of said locking circuit means.

* * * * *